Figure 4:
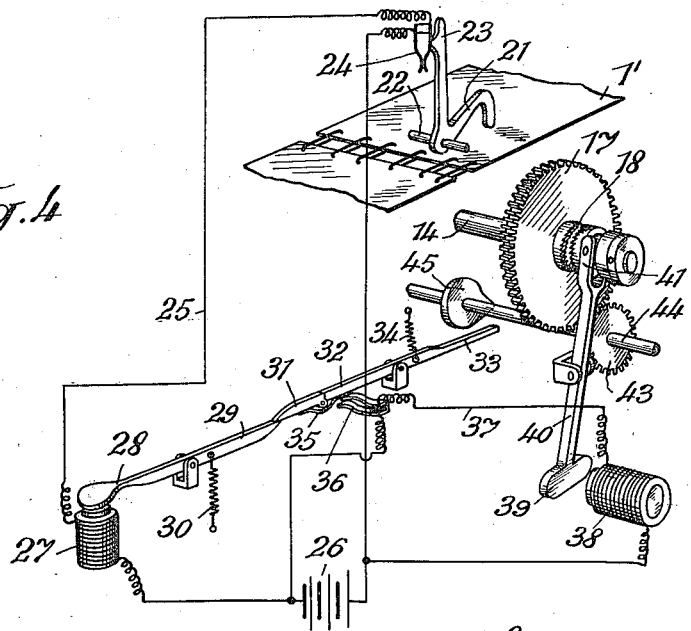

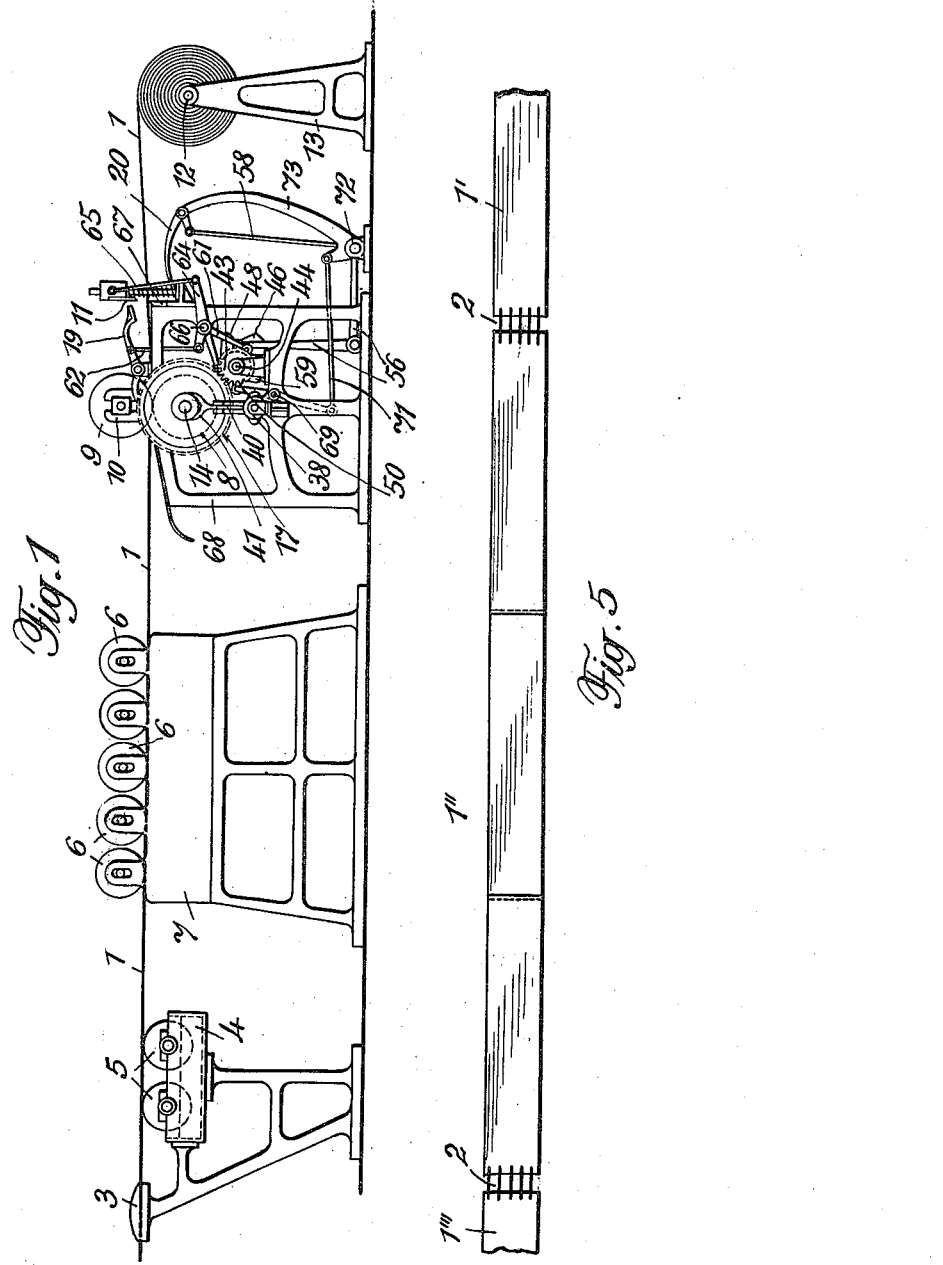

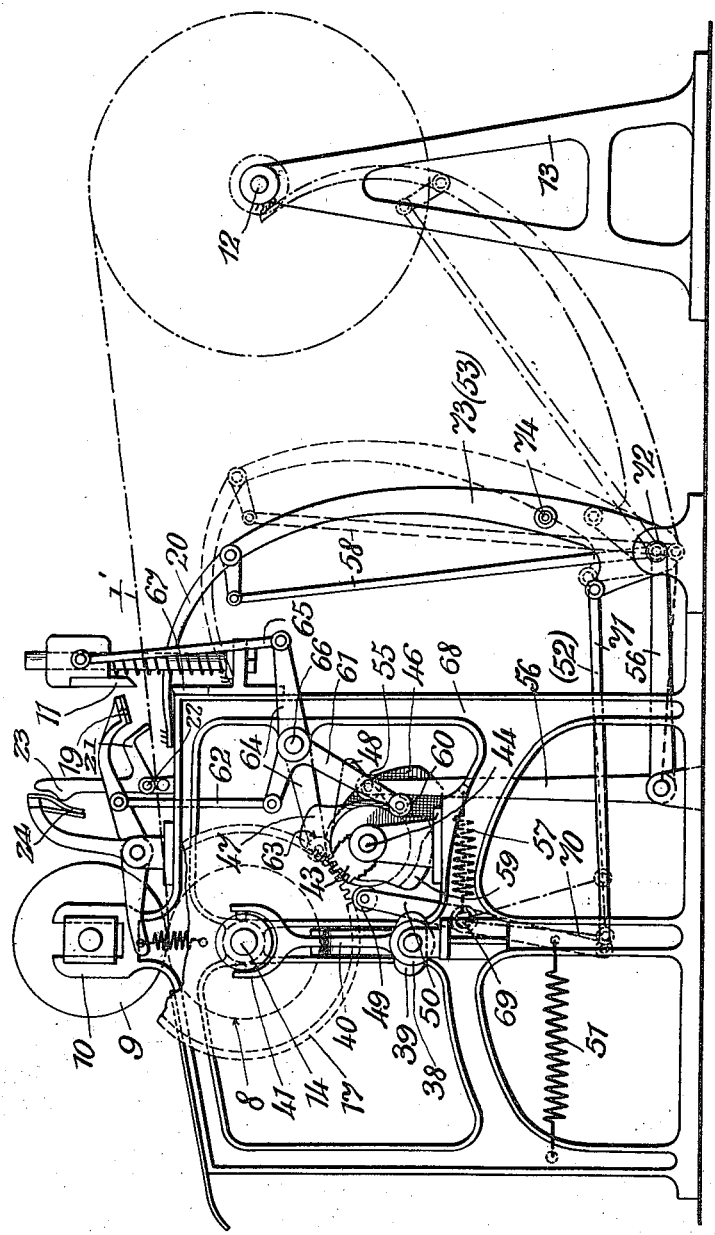

P. BISCHOFF.
MACHINE FOR WINDING STRIPS OF FABRICS.
APPLICATION FILED SEPT. 14, 1914.

1,211,058.

Patented Jan. 2, 1917.
5 SHEETS—SHEET 3.

Witnesses:
B. W. Sommers
C. Leckert

Inventor:
Paul Bischoff
By Henry Otto Jr.
Atty.

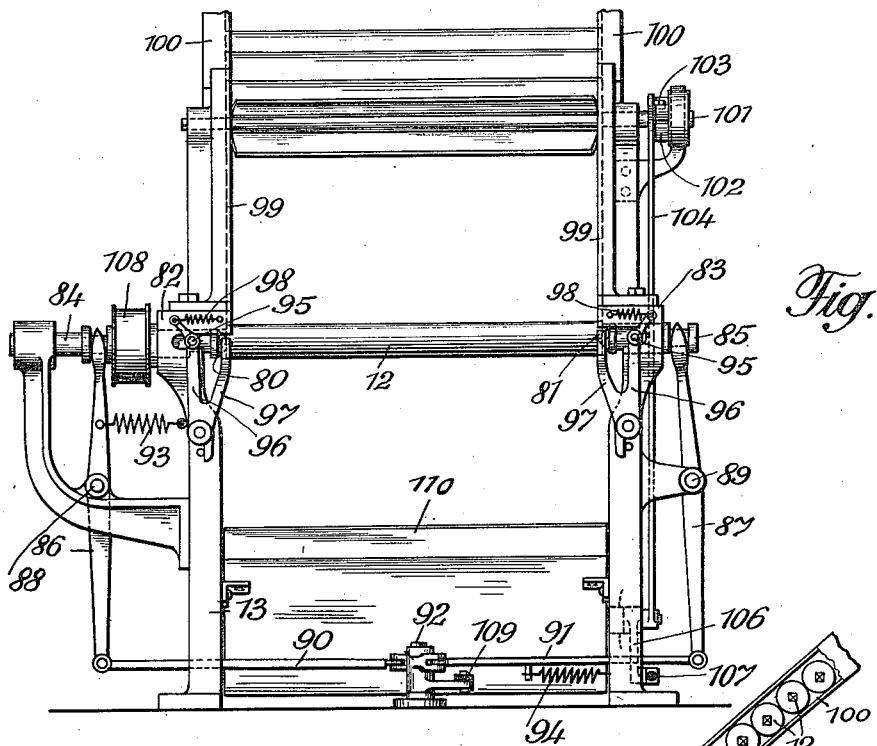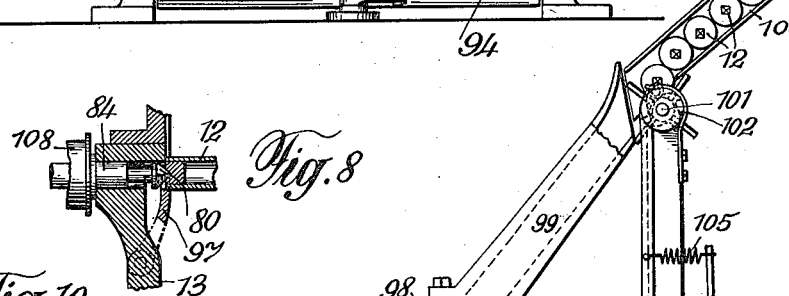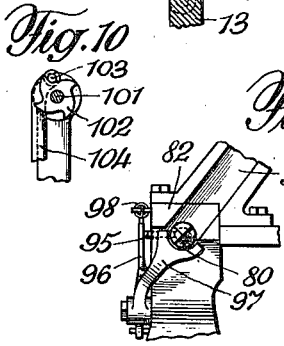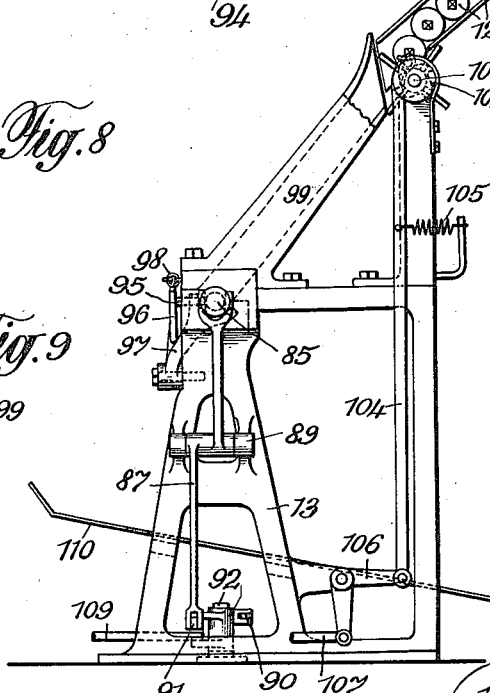

P. BISCHOFF.
MACHINE FOR WINDING STRIPS OF FABRICS.
APPLICATION FILED SEPT. 14, 1914.
1,211,058.
Patented Jan. 2, 1917.
5 SHEETS—SHEET 5.
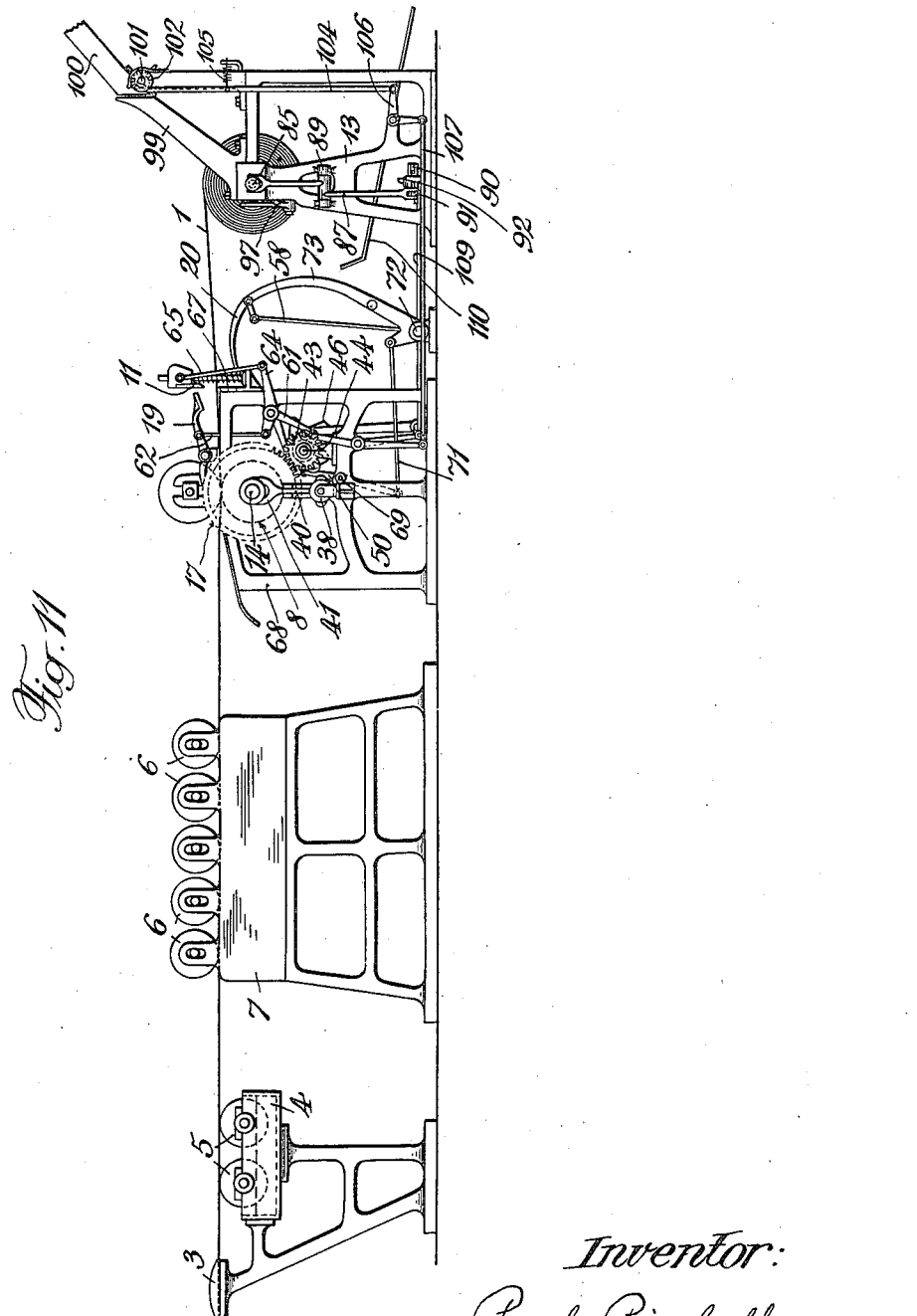
Inventor:
Paul Bischoff,
By
Atty

UNITED STATES PATENT OFFICE.

PAUL BISCHOFF, OF ST. GALLEN, SWITZERLAND.

MACHINE FOR WINDING STRIPS OF FABRICS.

1,211,058. Specification of Letters Patent. Patented Jan. 2, 1917.

Application filed September 14, 1914. Serial No. 861,603.

*To all whom it may concern:*

Be it known that I, PAUL BISCHOFF, a citizen of the Republic of Switzerland, residing at St. Gallen, Switzerland, have invented new and useful Improvements in Machines for Winding Strips of Fabrics; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to machines for winding strips of fabric, such as embroidery strips, festoons, insertions and the like, and provided with a cutting mechanism for automatically cuttting off strips of a predetermined length. The strips of textile fabric, such as continuous embroidery strips, manufactured on embroidering machines, festoons or insertions, are usually wound upon being severed into single strips, upon boards, such as card-boards and the like. In order to improve the appearance of the strips wound upon such boards it has been proposed to iron or smooth the upper layers of the strips. The present machines for cutting out fabric strips along an embroidered edge work, however, at such a speed, that a single attendant cannot keep up with the winding.

I am aware, that machines are known which are adapted to automatically wind up and cut off a predetermined length of tape or ribbon and provided with a fabric presser adapted to hold the fabric while it is severed and while the fabric feeding means are stopped. However, these machines do not allow an economical winding up of embroidery strips, as the end of each strip has to be fixed by hand to a card-board, wooden-board, drum, or to a fabric holder provided on such a drum.

The object of my invention is to provide a machine adapted to wind up such textile strips, preferably automatically.

A further object of my invention is to provide means for automatically cutting off strips having a predetermined length. In a machine constructed according to my invention these strips are neither wound upon card-boards, wooden-boards, nor on a drum, but they are automatically conveyed by means of a fabric catcher to an empty winding spindle. Thereby the catcher seizes the end of the fabric strip from behind the cutting means and said catcher is then returned to its initial position as soon as said end is fixed to the winding spindle.

Figure 3:
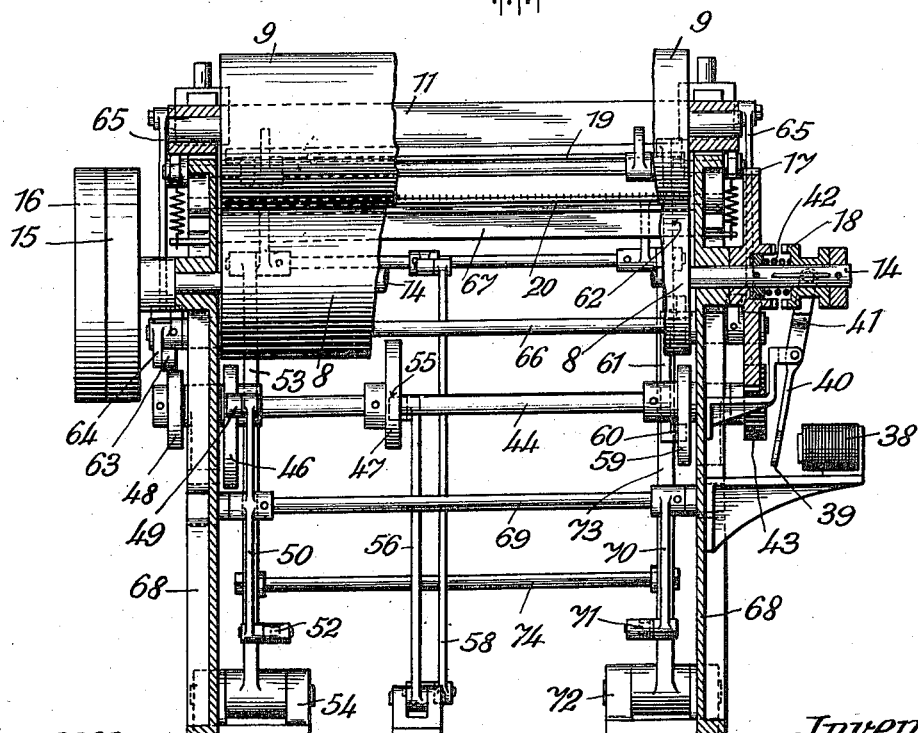

In the accompanying drawings—Figure 1 is a diagrammatic side view of a machine embodying my invention. Fig. 2 is a side view, on an enlarged scale, of a part of the machine. Fig. 3 is a cross section of Fig. 2, parts of the machine being partly broken off. Figs. 4 and 5 are detail views. Fig. 6 is a front view of an automatically driven winding spindle and of the means for automatically replacing the full spindles. Fig. 7 is a side view of the mechanism shown in Fig. 6, and Figs. 8, 9, and 10, are detail views of this mechanism. Fig. 11 is a diagrammatic side view of a complete machine including the mechanism for automatically replacing the full winding spindles.

In the arrangement shown it is assumed, that an embroidery strip cut out in a machine for cutting out fabric along an embroidered edge is fed from said machine toward the machine forming the subject matter of the present invention. Such strips often have a length of about 15 yards. The strips 1', 1'', 1''', (Fig. 5) are placed in a row and each third or fourth strip is then connected, preferably by hand, by means of a few loose stitches to the immediately following strip, (Fig. 5). A space 2 is provided between two such adjacent strips. This row of strips indicated by 1 in Fig. 1, is fed over a guide 3 mounted on a support and prevents a lateral displacement of this strip. The support carries a trough 4 in which are journaled two rotatably supported rollers 5 dipping into a liquid contained in said trough. The strip 1 runs over said rotating rollers 5, so that the liquid adhering to the circumference of these rollers comes in contact with this strip 1. Hereupon, the latter is acted upon by the yieldingly supported smoothing rollers 6 resting on the electrically heated surface of a table 7 and then it is caught by two rollers 8 and 9. The roller 8 has a positive motion, while the roller 9 is yieldingly mounted in a vertical direction and is supported by the lower roller 8. A fork-shaped bearing or support 10 serves to guide said roller 9 upon its yielding in a vertical direction. The strip then passes beneath a knife 11 and its free end is finally fixed to a winding spindle 12, carried by a support 13. In order that said strip end may be easily attached to the winding spindle 12, the latter is provided with pointed teeth.

The roller 8 is fixed on a shaft 14 which carries at one end a fast pulley 15 and a loose pulley 16 and at the other end a toothed wheel 17 loosely mounted on said shaft 14 and adapted to be operatively connected to the latter by means of a claw coupling 18 capable of being shifted in the longitudinal direction of the shaft 14.

Upon the rotation of the roller 8, and the roller 9 coöperating therewith, a pulling action is exerted upon the strip 1, so that the latter is fed, while passing beneath the knife 11 toward the winding spindle 12. According to the construction shown in Fig. 2 this winding spindle 12 has to be driven by hand, while in the construction shown in Figs. 6 to 10 there are provided special means to impart a positive drive to said spindle. In the construction shown in Fig. 2 the winding spindle 12 may be rotated in such a manner that the strip 1 receiving a constant feed movement does not sag too much while it is wound up. In order to prevent a too great sagging, it is advisable to provide a friction coupling to permit a certain slip of the strip as soon as the resistance of the pulling action upon the strip is too great. Such an arrangement is also necessary owing to the fact, that the strip has to be wound at a greater speed upon an empty winding spindle than upon a nearly filled spindle. Between the rollers 8, 9, and the knife 11, there is arranged a throwing-in device controlled by an electromagnet and adapted to operate the knife 11, a fabric presser 19, and a fabric catcher 20. To control the operation of these members there is provided a hook-shaped detector 21 (Fig. 4).

The detector is rotatably mounted upon a shaft 22 and it normally rests with its end 23 on an electric contact 24 of a circuit 25. The circuit 25 comprises also a battery 26 and electro-magnet 27, the latter attracting its armature upon a closing of the contact 24. The armature 28 forms one end of a pivotally mounted lever having two arms, the other end 29 of which is acted upon by a spring 30. The action of this spring 30 is such, that upon an opening of circuit 25, which occurs when the detector 21 drops into the space 2 between the ends of two strips, the armature 28 is moved away from its magnet 27, so that the end 29 is moved downward. During the winding of the strip the end 29 acts as a support for a lever 32 having a pivotally connected end 31, the other end 33 of which is acted upon by a spring 34. A spring 35 normally keeps the end 31 in such a position that it forms a prolongation of the lever 32. Upon a downward movement of the lever 32, the latter effects the closing of an electric circuit 37 comprising the battery 26 and an electro-magnet 38, the armature 39 of which forms the end of a clutch controlling lever 40. The other end 41 of this lever 40 is fork-shaped and engages a groove of the claw coupling 18, so that upon an attraction of the armature 39 by the magnet 38 the toothed wheel 17 is operatively connected to the shaft 14. Between the coupling 18 and the toothed wheel 17 there is provided a spring 42 (Fig. 3) effecting an automatic throwing out of the clutch as soon as the circuit 37 is opened. A toothed wheel 43 engages the toothed wheel 17, said wheel 43 being fixed to shaft 44 provided with cams 45, 46, 47, 48, and 59.

The cam 45, (Fig. 4) effects an opening of the circuit 37, as soon as the shaft 44 has completed one revolution, by pressing the end 33 of the lever 32 downward, so that the contact 36 is opened and the electro-magnet 38 cannot further attract its armature 39, and the spring 42 will effect a throwing out of gear of the toothed wheel 17. The pivotally mounted end 31 will be brought, however, to bear again on the end 29 of the lever 28, 29, as soon as the end 33 of lever 32, 33, is again moved upward by the action of spring 34.

The cam 46 (Fig. 2) serves to actuate the fabric catcher 20, there being provided for this purpose a roller 49 carried by a lever 50, which is acted upon by a spring 51 and which actuates a rod 52 connected with an arm 53. On one end of this arm 53 there is pivotally mounted the fabric catcher 20, while its other end is pivotally mounted on a support or bearing 54, (Fig. 3). The lever 50 is fixed to one end of a shaft 69 carrying at its other end a lever 70 actuating a rod 71 connected with an arm 73 pivotally supported in a bearing 72. The fabric catcher 20 is also pivotally mounted on the arm 73, so that said fabric catcher 20 may be simultaneously acted upon on both its ends. The two arms 53 and 73 are connected by means of a rod 74.

The lifting and depressing of the fabric catcher 20 is effected by the cam 47, engaged by a roller 55 on one arm of a bell crank lever 56 acted upon by a spring 57, the other arm of said lever being connected to the fabric catcher by a rod 58.

The cam 59 actuates the fabric presser 19 by means of a roller 60, a bell crank lever 61 and a rod 62.

The cam 48 actuates the knife 11, there being provided to this end as intermediate members, a roller 63, levers 64, and rods 65. In the drawing (Fig. 3) I have shown only the lever 64 and the rod 65 provided on the left side of the frame, it being understood however, that such a lever and rod are also provided on the right side.

The levers 64 are mounted on the same shaft 66. The knife 11 is held in its uppermost position by means of a spring.

67 denotes a knife coöperating with the knife 11.

The distance between the frame 13 and the frame 68 is such, that the end of the fabric catcher 20 having pointed teeth can just touch the winding spindle 12 when it is swung farthest away from the frame 68.

For the sake of clearness I have not shown in Fig. 2 the hereinbefore described throwing-in mechanism shown in Fig. 4, and controlled by an electro-magnet. I wish to point out, however, that this mechanism is arranged at such a distance in front of the knife 11 that the space 2 is moved by the roller 8 during the time interval, which the throwing-in mechanism requires for arresting the feeding movement. For the sake of clearness the cam 45 adapted to stop the shaft 44 is also not shown in Figs. 2 and 3.

The working of the hereinbefore described machine is as follows: The fabric catcher 20 is normally in its position of rest indicated in Fig. 2 in dotted lines. The front end of strip 1 is fed over the guide 3, over the rollers 5, beneath the smoothing rollers 6, passed between the rollers 8 and 9, whereupon it is attached to the pointed teeth provided on the winding spindle 12. Hereupon, the shaft 14 and the winding spindle 12 are rotated. The strip 1 is then pulled forward by the rollers 8 and 9, it being thereby moistened by the rollers 5 and ironed or smoothed by the smoothing rollers 6, so that it is conveyed to feed rollers 8 and 9 in a smoothed condition. This strip passes then underneath the detector 21 (Fig. 4) and is finally wound upon the winding spindle 12. As soon as the space 2, provided between the strips 1' and 1'', passes underneath the detector 21, the latter moves downward, i. e., is rocked. This has the effect of opening the electric contact 24 and the circuit 25, so that the armature 28 is no longer attracted by the electro-magnet 27, and the spring 30 can now pull the end 29 of the lever 28, 29, downward. The spring 34 is then able to pull the end 33 of the lever 32 upward, and as the end 31 does not now rest on said end 29, the contact 36 and also the electric circuit 37 will be closed. The electro-magnet 38 attracts its armature 39, effecting thereby the coupling of the toothed wheel 17 with the shaft 14. Thus, the shaft 44 provided with the hereinbefore mentioned cams is rotated. Owing to the rotation of this shaft 44 the roller 55 resting on the cam 47 is moved by the spring 57 toward the axis of the shaft 44 and the lever 56 is moved from the position shown in Fig. 2 by dotted lines into the position indicated by full lines, lifting thereby the fabric catcher 20. At the same time the roller 49 is acted upon in such a manner by the cam 46, that the lever 50 is also moved from the position indicated in Fig. 2 by point and dash lines into the position indicated by full lines, so that the two arms 53 and 73 are moved toward the frame 68. The fabric catcher 20 then comes to rest on the frame 68. This position is indicated in Fig. 2 in full lines. Upon a further rotation of the shaft 44 the cam 59 moves the roller 60 outward, so that the fabric presser 19 is moved downward to hold the fabric fast on the frame 68. At the same time this fabric presser 19 presses the end of the strip 1'' into the teeth of the fabric catcher 20 and its backwardly extending arm lifts the roller 9, so that the strip 1 is no longer fed forward. Meanwhile, the detector 21 has been lifted by the immediately following strip 1'' out of the space 2 (Fig. 4) and it now engages said strip 1''. The space 2 is now below the cutting knife 11 and the circuit 25 is now again closed and the armature 28 again attracted by the magnet 27. The upward movement of lever 29, upon the closing of circuit 25, does not change the position of lever 32, which is held depressed against the contacts 36 by the spring 34, as the end 31 of said lever 32 is out of the path of the lever 29 during said upward movement of the latter. As long as contacts 36 are held together by the lever 32 the circuit 37 is closed, the armature 39 attracted and the shaft 44 with cam 45 rotated. When the cam 45 engages the end 33, thereby depressing it and raising the end 31, the latter is engaged by the lever 29; the spring 35 allows the end 31 to yield until the lever 32 is raised above the plane of lever 29. When this position is reached, the end 31 will be snapped back into the plane of lever 32 and project beyond and rest on lever 29 and the circuit 37 held open. When the circuit 25 is broken as above described, the lever 29 will fall, releasing lever 32 and again closing circuit 37.

Just at the moment, in which the space 2 is below the knife 11, the roller 63 is acted upon in such a manner by the cam 48 that the knife 11 is moved downward to sever the two strips 1' and 1''. Immediately afterward the filled winding spindle 12 is removed from the frame 13 and replaced by an empty one. In the construction shown in Fig. 2 this is done by hand, while in the construction shown in Figs. 6 to 10, this is effected automatically. After the strip has been severed the knife 11 is lifted by its springs and the roller 60 comes out of engagement with the higher portion of the cam 59, so that the fabric presser 19 is raised while the roller 9 is lowered till it comes to rest again on the roller 8. The strip 1'' is now fed forward. At the same time the arms 53 and 73 are swung into their outermost position, the roller 49 being acted upon by the higher portion of the cam 46, so that the fabric catcher 20 is moved into the position shown in Fig. 2 in point and dash lines for the purpose of attaching the end of the embroidery strip 1'' to the winding spindle 12. Upon a rotation of this spindle 12 the fabric is caught by the small teeth provided on said spindle 12 and is then fixed to the latter. After this has been done, the roller 49 acted upon by the spring 51 leaves the higher portion of the cam 46, so that the rods 52 and 71 move the arms 53 and 73 from the position shown in Fig. 2 by point and dash lines back into the position indicated by dotted lines. Shortly before the fabric catcher 20 reaches its position of rest, the roller 55 is acted upon by the higher portion of the cam 47, so that the bell crank lever 56 is oscillated outward and the rod 58 moves the fabric catcher 20 downward into its position of rest. The cam 45 (Fig. 4) acts now upon the end 33 of the lever 31, 32, 33, so that the end 32 is moved upward and the pivotally mounted end 31 is pressed downward against the action of the spring 35 as soon as it engages the lever end 29, till it has passed said end, whereupon it comes to rest again on said end 29. The electrical circuit 37 is now opened, the electro-magnet 38 releases its armature 39, and the spring 42 throws the sleeve 18 out of engagement with the toothed wheel 17, so that the shaft 44 carrying the cams is brought to a standstill, and is only again actuated upon the next actuation of the detector 21.

I wish it to be understood, that the liquid in the trough 4 could also be a stiffening or finishing liquid. For the purpose of automatically changing the winding spindles 12, I may provide the construction shown in Figs. 6 to 10. In the device shown in these figures, an empty winding spindle is automatically guided toward the bearing or supporting members as soon as a filled winding spindle has been removed from said supporting members. For this purpose I provide means for holding fast the winding spindle, which means are adapted to release the full spindle as soon as they are withdrawn, so that said spindle may be removed from the machine. At the same time I provide also means for releasing an empty winding spindle contained in a suitable receptacle as soon as said full spindle has been removed. This released empty spindle is at first supported by suitable catching means, so that this empty spindle is already in the proper position when it is engaged by punches or pointed journals adapted to hold it while the strip is wound upon said spindle.

In the construction shown in Figs. 6 to 10, the spindle 12 is supported by two pointed journals or punches 80 and 81 projecting into two recesses provided on both ends of this spindle. Both these journals are movable in the longitudinal direction of supports 82 and 83 of the frame 13. These journals 80 and 81 are fixed to the end of a shaft 84 and 85 respectively, acted upon by levers 86, 87. These levers are rotatably mounted in side bearings 88 and 89, respectively, of the frame 13. The ends of the levers 86 and 87 arranged underneath said side bearings 88 and 89 are connected with rods 90 and 91 acted upon by a rotatably mounted vertical journal 92. The upper end of the lever 86 is acted upon by a spring 93, which has the tendency to press the pointed journals 80 and 81 into the recesses of the winding axle 12. A spring 94 fixed to one end of the rod 91 acts in the same manner. Between each pointed journal and its shaft there is provided an annular recess, into which there projects a pin 95. The width of this recess is greater than the diameter of the pin 95. The latter is fixed to the end of a lever 96, whose other end is pivotally fixed to the frame 13. This lever 96 carries an arm 97 having a fork-shaped end adapted to catch an empty winding spindle. The lever 96 is acted upon by a spring 98, which serves to pull the lever 96 and the fork-shaped piece connected therewith toward the winding spindle. The frame 13 has two guide troughs 99. The upper end of these troughs is arranged immediately below a receptacle 100 for the empty winding spindles, while the lower end of said troughs is so disposed, that the spindles leaving said trough are directed toward the fork-shaped ends of the two arms 97. Beneath the receptacle 100 there is arranged a shaft 101 provided with four spokes adapted to push the lowermost empty winding spindle out of the receptacle 100 (Fig. 7). To the end of the shaft 101 there is fixed a ratchet wheel 102 (Fig. 10). A finger 103 fixed to the end of a lever 104 projects between two teeth of said ratchet wheel. This lever 104 is acted upon by a spring 105, having the tendency to continuously press the finger 103 toward the ratchet wheel 102. A bell crank lever 106 is connected to the lower end of the lever 104, said lever 106 being moved by a rod 107 in such a manner, that the lever 104 is pulled downward. In order that the two pins 95 may be moved in the hereinbefore mentioned annular recesses, there is provided in each support 82 and 83 respectively, a slot, and these supports are so arranged, that the fork-shaped ends of the arms 97 may be pushed away from underneath the filled winding spindle. A driving pulley 108 is fixed to the spindle 84, said pulley transmitting the drive to the winding spindle. The rotation of the journal 92 is effected by a connecting rod 109. The connecting rods 107 and 109 receive at the right moment their motion from the hereinbefore mentioned shaft 44 carrying the cams, 45, 46, 47, and 48.

The mechanism shown in Figs. 6 to 10 works as follows: The winding spindle 12 is jammed between the punches or pointed journals 80 and 81 and it receives its drive from the pulley 108. As soon as the predetermined length of strip has been wound upon said spindle, the knife severs, as already mentioned, two adjacent strips. Immediately afterward the shaft 44 actuates the connecting rod 109 and the levers 86, 87, pull the journals 80, 81, out of the recesses provided in the winding axle 12, so that the filled winding axle 12 will rest on the fork-shaped ends of the two arms 97. Upon a further withdrawal of the pointed journals 80 and 81 also the two pins 95 will be moved outward against the action of the springs 98, so that the fork-shaped pieces are withdrawn from underneath the winding spindle. The latter falls then upon a guide plate 110, which causes said spindle to roll away from the machine. While the fork-shaped pieces are returned into their initial position, the lever 104 is pulled downward, the finger 103 rotates the ratchet wheel 102 through an angle of 90°, the lowest empty winding spindle carried by the spokes of the shaft 101 is dropped into the guide-troughs 99 and the lowest, but one empty winding spindle comes to lie between two spokes of said wheel, thus replacing the empty winding spindle, which has been conveyed into the guide-troughs 99. This latter spindle is caught by the fork-shaped pieces, which keep it in such a position, that the pointed journals 80 and 81, which are now moved inward, come to lie within the recesses on the empty winding spindle. As soon as this is effected the fabric catcher may attach the end of a new strip to said empty winding spindle.

I claim:—

1. In a machine for winding up fabric strips of a predetermined length, such as embroidery strips, festoons, insertions and the like, a winding spindle, fastening means on the latter for the end of a strip, means to automatically cut off strips of predetermined length, means for automatically catching the beginning of the fabric strip from behind the cutting means, means for bringing and attaching said end automatically to said fastening means, and controlling means including a detector engaging the strip to be wound for bringing said catching and cutting means automatically into operation.

2. In a machine for winding up fabric strips of a predetermined length, such as embroidery strips, festoons, insertions, and the like, a winding spindle, means for rotating said spindle, fastening means on the latter for the end of a strip, means to automatically cut off strips of predetermined length, a pivotally mounted arm, a fabric catcher carried by said arm and adapted to catch the end of a strip from behind the cutting means and to hold the end of said strip, means for moving said arm and fabric catcher toward the spindle to automatically attach the end of the strip to said fastening means, and controlling means including a detector engaging the strip to be wound for bringing said catching and cutting means automatically into operation.

3. In a machine for winding up fabric strips of a predetermined length, such as embroidery strips, festoons, insertions, and the like, a winding spindle, means for rotating said spindle, fastening means on the latter for the end of a strip, means to automatically cut off strips of predetermined length, a pivotally mounted arm, a fabric catcher carried by said arm and adapted to catch the end of a strip from behind the cutting means and to hold the end of said strip, means for moving said arm and fabric catcher toward the winding spindle, to automatically attach the end of the fabric to said fastening means, a fabric presser for holding the strip during the cutting operation and fastening the end of the strip to said fabric catcher, and controlling means including a detector engaging the strip to be wound for bringing said catching and cutting means automatically into operation.

4. In a machine for winding up fabric strips of a predetermined length, such as embroidery strips, festoons, insertions, and the like, a winding spindle, means for rotating said spindle, fastening means on the latter for the end of a strip, means to automatically cut off strips of predetermined length, means for automatically catching the end of the fabric strip from behind the cutting means, means for bringing and attaching said end automatically to said fastening means, a fabric presser normally held above the strip, two coöperating rollers for moving the strip forward, means for actuating said fabric presser to hold the strip, one of said rollers being carried by said fabric presser in such a manner that said roller is lifted when the fabric presser acts upon the strip, means for rotating the other roller, and controlling means including a detector engaging the strip to be wound for bringing said catching and cutting means automatically into operation.

5. In a machine for winding up fabric strips of a predetermined length, such as embroidery strips, festoons, insertions and the like, a winding spindle, means for rotating said spindle, fastening means on the latter for the end of a strip, means to automatically cut off strips of predetermined length, a pivotally mounted arm, mechanism for actuating said arm, a fabric catcher carried by said arm adapted to catch the end of a strip from behind the cutting means and to hold the end of said strip, means for moving said fabric catcher toward the winding spindle to automatically attach the end of the fabric to said fastening means, a fabric presser to hold the strip during the cutting operation and to fasten the end of the strip to said catcher, two coöperating rollers for moving the strip forward, one of said rollers being carried by said fabric presser and lifted thereby when the latter acts upon the strip, means for rotating the other roller, and controlling means including a detector engaging the strip to be wound for bringing said catching and cutting means automatically into operation.

6. In a machine for winding up fabric strips of a predetermined length, such as embroidery strips, festoons, insertions, and the like, a winding spindle, means for rotating said spindle, fastening means on the latter for the end of a strip, means to cut off strips of predetermined length, a pivotally mounted arm, mechanism for actuating said arm, a fabric catcher carried by said arm adapted to catch the end of a strip from behind the cutting means and to hold the end of said strip, means for moving said fabric catcher toward the spindle to automatically attach the end of the fabric to said fastening means, a fabric presser adapted to hold the strip during the cutting operation and to fasten the end of the strip to said catcher, a detector engaging the strip, and means controlled by said detector to automatically actuate said cutting means, catcher, and presser.

7. In a machine for winding up fabric strips of a predetermined length, such as embroidery strips, festoons, insertions and the like, a winding spindle, means for rotating said spindle, fastening means on said spindle for the end of a strip, means to automatically cut off strips of predetermined length, means for automatically catching the end of the fabric strip from behind the cutting means, means for conveying and attaching said end automatically to said fastening means, means for holding the strip during the cutting operation, a main driving shaft, a secondary shaft, means for coupling said shafts, cams on the secondary shaft for actuating said cutter, catcher, conveyer and attacher, and said means for holding the strip during the cutting operation, a detector engaging the strip, and means controlled by said detector for automatically bringing the coupling of the shafts into operation.

8. In a machine for winding up fabric strips of a predetermined length, such as embroidery strips, festoons, insertions, and the like, a winding spindle, means for rotating said spindle, fastening means on the spindle for the end of a strip, means to automatically cut off strips of predetermined length, means for automatically catching the end of the fabric strip from behind the cutting means, means for conveying and attaching said end automatically to said fastening means, means for holding the strip during the cutting operation, a main driving shaft, a secondary shaft, means for coupling the driving shaft with said secondary shaft, cams on the secondary shaft for actuating the cutter, catcher, conveyer, and the means for holding the strip during the cutting operation, a cam to throw out said coupling means upon a revolution of said secondary shaft, a detector engaging the strip, and means controlled by said detector for automatically bringing the coupling means into operation.

9. In a machine for winding up fabric strips of a predetermined length such as embroidery strips, festoons, insertions and the like, a winding spindle, means for rotating said spindle, fastening means on the spindle for the end of a strip, means to automatically cut off strips of predetermined length, means for automatically catching the end of the fabric strip from behind the cutting means, means for conveying and attaching said end automatically to said fastening means, means for holding the strip during the cutting operation, a main driving shaft, a secondary shaft, means for coupling said shaft, cams on said secondary shaft for actuating said cutter, catcher, conveyer, and means for holding the strip during the cutting operation and for throwing out the coupling means upon a complete revolution of the secondary shaft, a detector engaging the strip, and means controlled by said detector for automatically bringing the coupling means into operation.

10. In a machine for winding up fabric strips of a predetermined length, such as embroidery strips, festoons, insertions and the like, a winding spindle, fastening means on said spindle for the end of a strip, means to automatically cut off strips of predetermined length, means to automatically catch the end of the fabric strip from behind the cutting means, means adapted to bring and attach said end automatically to said fastening means, and controlling means including a detector engaging the strip for bringing said cutting and catching means automatically into operation.

11. In a machine for winding up fabric strips of a predetermined length, such as embroidery strips, festoons, insertions and the like, a winding spindle, fastening means on the latter for the end of a strip, means for automatically rotating said spindle, movable supports for said spindle, means to cut off strips of a predetermined length, means to remove said supports so that the filled winding spindle may leave the supports after a strip has been severed from the immediately following strip, means to catch the end of the fabric strip from behind the cutting means, means to carry and attach said end automatically to said fastening means, and controlling means including a detector engaging the strip for bringing said cutting, support removing, catching and carrying means automatically into operation.

12. In a machine for winding up fabric strips of a predetermined length, such as embroidery strips, festoons, insertions and the like, a rotatable spindle, fastenings on the latter for the end of a strip, movable supports for said spindle, means to cut off strips of a predetermined length, means to move said supports out of their normal position to remove the full spindle, means to release an empty spindle, means to guide an empty spindle toward the place left by said removed full spindle, means at one end of said guide means to catch said empty spindle, means to move said movable supports back into their initial position, means to catch the end of the fabric strip from behind the cutting means, means to carry and attach said end to said fastenings, and mechanism including a detector engaging the strip for automatically bringing the aforesaid means successively into operation.

In testimony that I claim the foregoing as my invention, I have signed my name in presence of two subscribing witnesses.

PAUL BISCHOFF.

Witnesses:
J. M. BOWCOCK,
E. WARTENWEILER.